Feb. 23, 1943.  E. F. W. ALEXANDERSON  2,312,062
ELECTRIC DRIVE
Original Filed Nov. 20, 1940
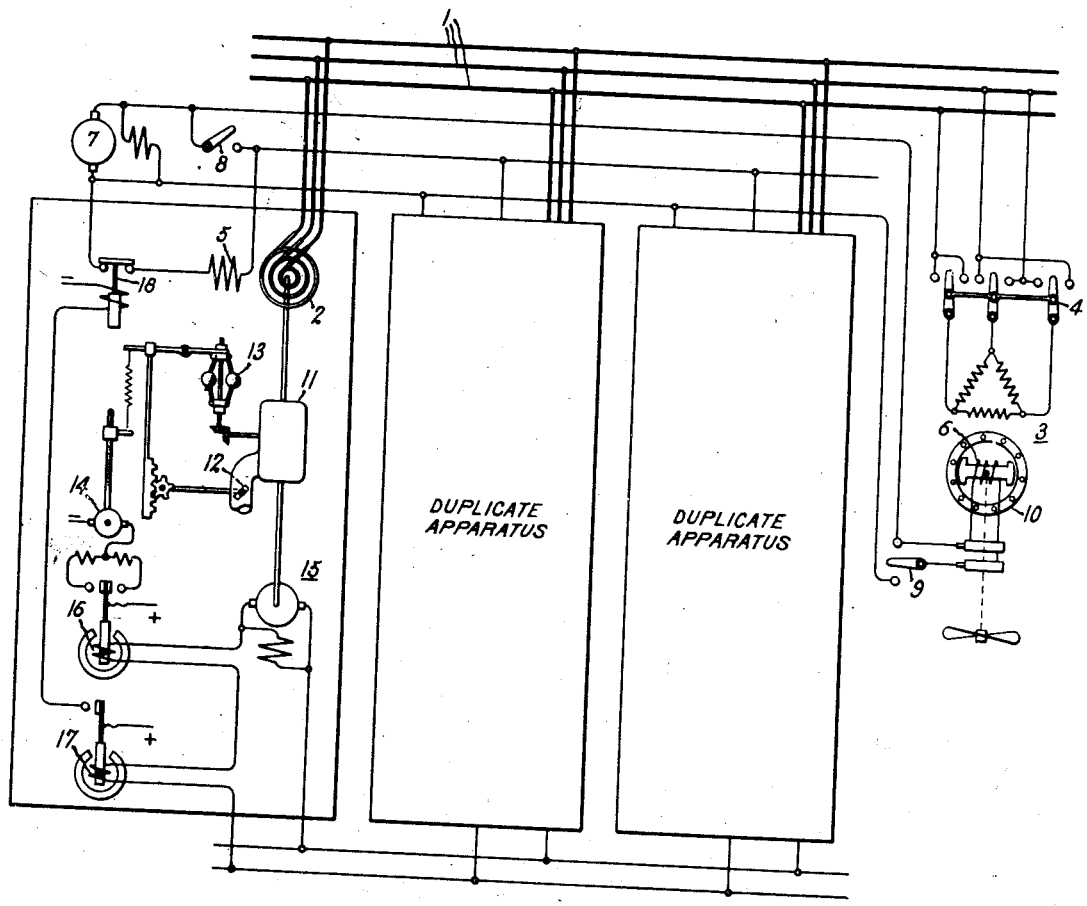
Inventor:
Ernst F. W. Alexanderson,
by Harry E. Dunham
His Attorney.

Patented Feb. 23, 1943

2,312,062

UNITED STATES PATENT OFFICE 2,312,062

ELECTRIC DRIVE

Ernst F. W. Alexanderson, Schenectady, N. Y., assignor to General Electric Company, a corporation of New York Original application November 20, 1940, Serial No. 366,322. Divided and this application January 28, 1942, Serial No. 428,579

3 Claims. (Cl. 172—8)

This invention relates to electric drives and more particularly to improvements in the control of multiple-unit power-plant synchronous-to-synchronous type reversible electric drives.

This is a division of my application, Serial No. 366,322 filed November 20, 1940, and assigned to the assignee of the present application.

By "multiple-unit power-plant" is meant that the electric generating portion of the drive consists of a plurality of parallel-connected generators, each of which is driven by its own individual prime mover such, for example, as a Diesel engine. These generators supply current to a single motor and by "synchronous-to-synchronous" it is meant that the motor and the generators are synchronous machines. That is to say, they have alternating current carrying armature windings, which are usually the stator windings, and have direct current carrying field or exciting windings, which are usually mounted on the rotor. Although the motor normally operates as a synchronous motor it may also be operated for short periods as an induction motor in which case the ordinary amortisseur winding may be used as a squirrel cage winding.

The multiple unit idea is conducive to reliability so that such an electric drive is well adapted for naval vessels. Furthermore, the use of synchronous machines gives very desirable lightness as modern machines of this type have been made which weigh no more than four pounds per horsepower. In addition, the efficiency of these machines is high because their excitation is derived from direct current which is supplied at unity power factor, whereas in induction motors, for example, the alternating exciting or magnetizing current is supplied at very low power factor.

It is usually desirable that electric drives should be reversible and in the case of naval vessels it is highly desirable that the reversal will take place as rapidly as possible and at full power output. However, a ship propulsion system differs from ordinary drives in that after the driving motor has been stopped it tends to be rotated by the propeller so long as the ship is in motion because of the reaction of the water on the propeller blades. Therefore, if, for example, the ship has been operating in a forward direction and the motor is brought to standstill by suitable braking means, the inertia of the ship still keeps it in motion so that a powerful torque is exerted by the propeller on the motor tending to rotate it in the forward direction and this torque must be overcome before the motor can be accelerated in the reverse direction.

In the prior art this problem has been solved in two ways. One method which has been used on turbo-electric ships is to increase the field excitation of the generators and use the propeller motor as an induction motor for both braking and reversal. Induction motor braking is sometimes referred to as "plugging" and consists of reversing the phase connections of the motor so as to produce a decelerating torque. This method is applicable to multiple generators driven by Diesel engines as well as to single generators driven by turbines, but has the limitation that braking by induction motor action is rather inefficient and it is found that when the weight of the motors and generators is reduced to meet modern requirements the induction motor braking torque is not sufficient to bring the motor to standstill against the torque of the water acting on the propeller.

Another method which has been used on Diesel electric ships with multiple generators is to disconnect the motor from the generators and bring the motor to standstill by applying field to the motor while resistance is introduced in the armature. The multiple generators are in the meantime maintained in synchronism by uninterrupted application of generator field. A change in connection is then made whereby the motor is brought up to speed in the reversed direction with an induction motor with reversed phase rotation fed from the generator bus bar. This method, however has the limitation that the switching must be done with the generator bus bars alive. In modern high power vessels this is a serious objection.

The solution which I propose combines the advantages of the first and second methods. It retains the advantage of the system used in many turbo-electric ships that have been built, that switching is done on dead circuits, but at the same time it makes it possible to use multiple generator units. It is characterized by removing the generator excitation while connections are being changed and I have found by test that the desired results may be obtained by the following sequence of control. First, field is removed on both the generators and the motor. Second, the phase rotation of the connections between the motor and the generators is reversed. Third, field is applied to the motor which thereby develops a powerful dynamic braking torque due to the currents flowing in the closed circuit between the motor and the generators and in this way the propeller is brought to standstill. Fourth, field excitation is applied to the generators substantially simultaneously with the removal of field excitation from the motor. As a result of this the generators synchronize with each other and cause the propeller motor to act as an induction motor with the required reversing torque.

I have found that if the generators are driven by prime movers with reasonably equal torque characteristics the synchronization takes place so fast that the induction motor torque appears for all practical purposes immediately. I realize, however, that over a wide range of speed settings such, for example, as a range of 4 to 1 centrifugal governors and their controlled engines will not always have sufficiently similar speed torque characteristics to enable rapid self-synchronization or even self-synchronization at all. A 4 to 1 range of speed adjustment is, however, almost necessary because the speed setting of the governors should be adjusted to about one-quarter speed in order to obtain the maximum motor starting torque, it being remembered that the slip torque characteristic of an induction motor is such that maximum torque occurs at a point between zero and 100% slip and generally in the neighborhood of about 75% slip.

In order to compensate for inequalities in governor and engine characteristics over a wide range of speed settings it may therefore be necessary to provide an automatic device for readjusting the governors so as to synchronize the generators. During the period when such automatic synchronizer is acting there will thus be an interval when full induction motor torque is not being developed. I have found, however, that during this interval before the generators have synchronized the propeller motor develops a pulsating torque which is sufficient to hold the motor at standstill until synchronization is completed and full reversing torque is applied.

Sometimes the governor characteristics or settings may be so dissimilar that the weaker machine will stall before the automatic synchronizing means can correct the situation. An additional explanation for this is that the power factor of the inductive load increases with decreasing frequency, thus giving an unstable speed torque characteristic. As stalling of the prime mover, particularly if it is a Diesel engine, is highly undesirable and as the automatic resynchronizing means may not operate fast enough to prevent stalling, it is also desirable to have automatic means for quickly removing the load on a machine whose speed drops seriously below the average speed of all of the machines.

An object of the invention is to provide a new and improved method of reversing a ship propeller motor.

Another object of the invention is to provide a new and improved method of controlling a ship propelling synchronous motor which is energized by a plurality of parallel connected synchronous generators.

The invention will be better understood from the following description taken in connection with the accompanying drawing and its scope will be pointed out in the appended claims.

Referring now to the single figure of the accompanying drawing, which illustrates diagrammatically an example of the apparatus employed in practicing my invention, the main elements are a main three-phase power circuit 1 across which are connected a plurality of synchronous generators 2 and a synchronous motor 3.

In order to simplify the drawing mere duplication has been avoided by showing one generator 2 and its driving and individual control equipment in a box and it is to be understood that the other appropriately labeled boxes contain duplicate equipment. The phase rotation of the motor connections is made selectively reversible by means of a reversing switch 4. The generators are each provided with a direct-current field winding 5 and the motor is provided with a similar winding 6. These windings may be energized from any suitable source of direct current, such for example as a common shunt-connected exciter 7. A switch 8 is provided for selectively controlling the energization of all of the generator field windings 5 and a similar switch 9 is the corresponding controlling means for the motor field winding 6. The motor is also provided with an amortisseur or squirrel cage winding 10.

The generators are separately driven by suitable prime movers 11, such for example, as Diesel engines. These engines have throttles 12 controlled by speed governors 13 and the setting or spring tension of each governor is adjusted by a separate reversible synchronizing motor 14.

The automatic means for synchronizing the generators consists of individual devices driven by each engine for giving an indication of its speed. As shown by way of example, these devices are pilot or tachometer generators 15, all of which are electrically connected in parallel. The voltages of these generators are such that they are all equal when the speeds of their respective engines are equal under which conditions no current will flow in them. If, however, the speeds are different the voltages of the pilot generators will be unequal and the currents which flow in them will be proportional in magnitude to the difference between the speeds of their driving engines and the average speed of all of the driving engines and the polarity of these currents will be an indication of the direction of the departure of the individual engine speed from the average engine speed. Selective response to the polarity of such current is secured by separate contact-making polarized relays 16 connected in circuit with each of the pilot generators 15. Each relay is connected to control the operation of the reversible synchronizing motors 14 for the governor of its associated engine and the connections are such that when the engine speed departs from the average speed the response of the relay 16 is such as to cause the synchronizing motor 14 to adjust the governor setting in the proper direction to change the engine speed in the direction toward the average speed.

In order to prevent stalling of the engines 11 in case their speed should drop too rapidly for the automatic synchronizing means to restore synchronism, protective means is provided. This means is shown by way of example as another polarized relay 17 connected in series with the relay 16 and having a single set of contacts which are normally open but which close when the polarity of the pilot generator current is such as to indicate that its associated engine speed is below the average engine speed and when the magnitude of this current is higher than the magnitude of the current which causes operation of the relay 16. The contacts of the relay 17 control an auxiliary relay 18 for opening the generator field circuit so that whenever the engine speed falls seriously below the average speed its field energization is removed thereby substantially instantaneously removing the engine load and preventing the engine from stalling.

The method of reversing the motor 2 and the propeller 3 is as follows. Assume first that all of the synchronous machines are synchronized and that the generators are all supplying power to the motor 10 which is turning the propeller so as to drive the ship ahead. Under these conditions switches 4, 8 and 9 will be closed, relays 16 and 17 will be open and relays 18 will be closed. If now it is desired to reverse the motor 10, switches 8 and 9 are opened either in the order mentioned or in the opposite order or simultaneously; this removes the excitation from all of the machines and reduces the current in the main circuit 1 substantially to zero. The reversing switch 4 is then thrown to its other closed position, say, for example, from left to right. The switch 9 is then reclosed. The reaction of the water on the propeller due to the continued forward motion of the ship provides a powerful torque for continuing the rotation of the motor in the forward direction so that when field excitation is reapplied by the closing of the switch 9 the motor acts as a generator and supplies current to the relatively low resistance armatures of the parallel-connected generators 2. This constitutes a powerful dynamic braking circuit which very rapidly brings the motor 10 to standstill. I have found that this method of braking is the least expensive and most effective. Of course, the motor could be made to regenerate into separate resistances but this is expensive and requires additional switching means for the main power circuit. In theory it would also be possible to brake the motor 10 by plugging, that is, by energizing it as an induction motor with reversed phase rotation connections from the generators in which case the switch 8 would be closed instead of the switch 9. In that case the revolving amortisseur winding 10 co-operating with the stator winding would produce a reversed induction motor torque and this may also be strengthened by short circuiting of the winding 6, if desired. However, with low weight synchronous motors I have found that the braking torque obtained by this method is not sufficient to gain possession of the propeller and break it away from the water.

After the machine 10 has been braked to standstill the field switch 9 is again opened and the field switch 8 is closed. At this point it may be noted that so far as dynamic braking is concerned it is immaterial whether the phase rotation of the motor connections is reversed before the braking operation or after the braking operation as the braking torque will be the same in either case. However, it is preferable to remove the field excitation of all of the machines by opening both switches 8 and 9 and then reversing the connections by switch 4 instead of first dynamically braking the motor by merely opening switch 8 and then after it has been braked to standstill opening switch 9 and operating the reversing switch 4 because the water torque on the propeller continues after the motor has been brought to standstill so that the longer the interval of time during which there is no field on either the generators or the motor the better the opportunity the water has for regaining possession of the propeller and re-starting the motor in the forward direction. Therefore, after the motor has been dynamically braked to standstill with the phase rotation of its armature winding reversed the field switch 9 is again opened and the field switch 8 is closed immediately thereafter. During the dynamic braking operation the generators 2 have, of course, been without field excitation so that there has been no synchronizing torque to hold them in synchronism. Ordinarily, however, they will have substantially the same no-load speed by reason of the previous adjustment of their governors but in all events suitable automatic synchronizing means can be made to insure that their no-low speeds are substantially the same. However, synchronism of such machines depends not only upon their having the same speed but also their having the proper angular relationship between their rotors and in the absence of positive synchronizing torque it is impossible as a practical matter to maintain the speeds so uniform that loss of synchronism by relative phase displacement will not have taken place. Consequently, the generators will be out of synchronism when the switch 8 is reclosed. However, I have made the unexpected discovery that a strong holding torque is developed in the motor 3 as soon as the field excitation of the generators is restored and while they are out of synchronism. It is a pulsating torque and probably its frequency corresponds to a beat frequency produced by the combination of all of the individual generator frequencies. I have also found that a holding torque can be developed by not entirely removing the field excitation of the motor when the field is applied to the generators.

It is undesirable to apply full field to motor and generators simultaneously because of mechanical vibration but a small additional holding torque of this type is permissible if the holding torque of the first type is insufficient.

The restoration of field excitation on the generators causes a synchronizing torque to be produced between any two machines whose rotor positions drift into the proper angular relationship for synchronous operation and as has already been explained the slight differences in speed which are bound to exist will cause these relationships to occur so that the generators inherently tend to resynchronize themselves and when this occurs the voltage builds up and the motor starts turning in the reverse direction as an induction motor by reason of the squirrel cage secondary effect of its amortisseur winding 10.

As soon as the motor has attained full speed as an induction motor the switch 9 may be closed to restore current to the field winding 6 and the motor 3 will then pull into step with the generators by means of the above-described effect of the synchronizing torque and will operate thereafter as a synchronous motor.

If the individual engine or governor characteristics are so different that the difference between the engine torques under load is greater than the synchronizing torque the generators will of course not stay in synchronism but by reason of the unstable characteristic which tends to produce stalling, which has been described above, the change in speed resulting from such loss of synchronism while the generators are under load will be sufficient to cause operation of the synchronizing means which will act on all of the engines in such a manner as to reduce the speed of the fast engines and raise the speed of the slow engines and in cases of an aggravated loss of speed the action of the synchronizing means is aided by the action of the relay 17 for preventing stalling.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a synchronous-to-synchronous electric ship propulsion system of the type having a plurality of parallel-connected generators, the step in the method of reversing the ship which comprises holding the motor after it has been braked to standstill against the water reaction torque on the propeller by connecting the motor with reversed phase rotation and without direct current excitation to the parallel-connected generators when they are out of synchronism with the same direction of phase rotation and when they have normal direct current excitation.

2. In a synchronous-to-synchronous electric ship propulsion system of the type having a plurality of parallel-connected generators whose prime movers have substantially different speed-torque characteristics, the steps in the method of reversing the motor which comprise, dynamically braking the motor and propeller substantially to standstill, holding the motor substantially at standstill against the reaction torque of the water on the propeller by connecting it with reversed phase rotation as an induction motor without direct current excitation to the parallel generators when they are out of synchronism with the same direction of phase rotation and when they have direct current excitation, synchronizing said generators, and synchronizing said motor with said generators by applying direct current excitation thereto when it has attained substantial synchronism with said generators.

3. The method of reversing a synchronous propeller motor which is normally energized by a plurality of separately-driven parallel-connected synchronous generators comprising, removing the excitation of all of said machines whereby synchronism between all of them is lost, reversing the phase rotation of the connections between the motor and the generators, reapplying the motor excitation whereby the propeller is dynamically braked substantially to standstill by the motor acting as a synchronous generator which is loaded on the generator armatures, holding the propeller substantially at standstill with the generators out of synchronism with the same direction of phase rotation by again removing the motor excitation and substantially simultaneously reapplying the generator excitation whereby a pulsating holding torque is developed in said motor, resynchronizing said generators while they are excited whereby said motor accelerates with reversed rotation as an induction motor, and resynchronizing said motor by again applying excitation thereto when it reaches substantially synchronous speed.

ERNST F. W. ALEXANDERSON.